US009726248B2

(12) United States Patent
Camarasa et al.

(10) Patent No.: US 9,726,248 B2
(45) Date of Patent: Aug. 8, 2017

(54) VIBRATION ISOLATION MODULE HAVING REDUCED NONLINEAR EFFECTS

(71) Applicant: AIRBUS DEFENCE AND SPACE SAS, Les Mureaux (FR)

(72) Inventors: Patrick Camarasa, Rebigue (FR); Emmanuel Dhieux, Toulouse (FR)

(73) Assignee: Airbus Defence and Space SAS, Les Mureaux (FR)

( * ) Notice: Subject to any disclaimer, the term of this patent is extended or adjusted under 35 U.S.C. 154(b) by 0 days.

(21) Appl. No.: 15/033,600

(22) PCT Filed: Oct. 23, 2014

(86) PCT No.: PCT/FR2014/052702
§ 371 (c)(1),
(2) Date: Apr. 29, 2016

(87) PCT Pub. No.: WO2015/063397
PCT Pub. Date: May 7, 2015

(65) Prior Publication Data
US 2016/0252150 A1   Sep. 1, 2016

(30) Foreign Application Priority Data

Oct. 31, 2013 (FR) ..................... 13 60667

(51) Int. Cl.
*F16F 1/40*   (2006.01)
*F16F 3/12*   (2006.01)
(Continued)

(52) U.S. Cl.
CPC ............. *F16F 3/12* (2013.01); *F16F 1/40* (2013.01); *B64G 1/641* (2013.01); *F16F 15/08* (2013.01); *F16F 2230/00* (2013.01)

(58) Field of Classification Search
CPC ...... F16F 1/40; F16F 3/12; F16F 15/08; F16F 2230/00; B64G 1/641
(Continued)

(56) References Cited

U.S. PATENT DOCUMENTS 1,822,026 A * 9/1931 Guy ................. F16F 1/41
188/268
4,424,960 A * 1/1984 Dan ................. F16F 13/18
267/140.13
(Continued)

FOREIGN PATENT DOCUMENTS

FR   1448996 A    3/1966
FR   2895052 A1   6/2007

OTHER PUBLICATIONS

PCT International Search Report for PCT/FR2014/052702 mailed Apr. 1, 2015, 3 pgs.
(Continued)

*Primary Examiner* — Thomas Irvin
(74) *Attorney, Agent, or Firm* — Patterson Thuente Pederson, P.A.

(57) ABSTRACT

An isolation module between a vibration generating device, such as a satellite launcher, and a structure to be isolated, such as the structure carrying a satellite, comprising: at least two fastening parts, and a connecting means. The first fastening part, called the frame, comprises at least two parallel radial branches, and the second fastening part, called the support, comprises at least one radial branch extending between the two branches of the frame. The connecting means is made from an elastomer material and includes at least one pair of identical elastomer pads, being mounted in series between the frame and the support.

21 Claims, 9 Drawing Sheets

(51) Int. Cl.
*F16F 15/08* (2006.01)
*B64G 1/64* (2006.01)

(58) Field of Classification Search
USPC .................. 267/257, 292, 294; 248/611, 613
See application file for complete search history.

(56) References Cited

U.S. PATENT DOCUMENTS

| | | | | |
|---|---|---|---|---|
| 4,546,848 A * | 10/1985 | Iijima | ................... | B60K 17/16 |
| | | | | 180/312 |
| 5,358,210 A * | 10/1994 | Simon | ...................... | F16F 1/40 |
| | | | | 244/173.2 |
| 5,449,152 A * | 9/1995 | Byrnes | ................... | B64C 27/51 |
| | | | | 267/141.1 |
| 5,613,667 A * | 3/1997 | Ho | ...................... | B66B 11/0273 |
| | | | | 248/621 |
| 5,641,152 A * | 6/1997 | Angles | ................ | B60G 13/003 |
| | | | | 188/321.11 |
| 5,641,153 A * | 6/1997 | Gwinn | ................... | B60G 13/02 |
| | | | | 267/140.13 |
| 6,199,801 B1 | 3/2001 | Wilke et al. | | |
| 6,244,541 B1 * | 6/2001 | Hubert | ................... | B64G 1/22 |
| | | | | 244/173.2 |
| 6,290,183 B1 * | 9/2001 | Johnson | ................. | B64G 1/641 |
| | | | | 244/170 |
| 6,609,681 B2 * | 8/2003 | Buder | ................... | B64G 1/641 |
| | | | | 244/173.2 |
| 7,249,756 B1 | 7/2007 | Wilke et al. | | |
| 8,240,614 B2 * | 8/2012 | Camarasa | .............. | B64G 1/641 |
| | | | | 244/173.2 |
| 2003/0006341 A1 | 1/2003 | Buder | | |

OTHER PUBLICATIONS

English translation of PCT International Search Report for PCT/FR2014/052702, mailed Apr. 1, 2015, 2 pgs.
PCT Written Opinion for PCT/FR2014/052702 mailed Apr. 1, 2015, 6 pgs.
PCT/IPEA/409 for PCT/FR2014/052702, mailed Oct. 6, 2015, 6 pages.
English translation of PCT/IPEA/409 for PCT/FR2014/052702, mailed Mar. 21, 2016, 6 pages.

* cited by examiner

VIBRATION ISOLATION MODULE HAVING REDUCED NONLINEAR EFFECTS

RELATED APPLICATIONS

The present application is a National Phase entry of PCT Application No. PCT/FR2014/052702, filed Oct. 23, 2014, which claims priority from FR Patent Application No. 13 60667, filed Oct. 31, 2013, said applications being hereby incorporated by reference herein in their entirety.

FIELD OF THE INVENTION

The invention relates to an isolation module intended to be mounted between a vibration-generating device and a structure to be isolated. More particularly, the invention relates to such an isolation module intended to be mounted between a satellite launcher and a satellite.

BACKGROUND OF THE INVENTION

In the field of satellites, isolation between the satellite and the launcher assumes a major significance. Thus, in order to avoid transmission of the vibration generated by the launcher to the structure of the satellite and thereby to the equipment carried by the satellite, it is known to place isolation means between the satellite and the launcher. The isolation means must be capable of being effective over a wide frequency range and have sufficient mechanical performance to ensure the fastening and good mechanical strength of the satellite on the launcher.

More specifically, the launcher comprises a satellite interface ring and the satellite comprises a launcher interface ring. The interface rings are connected together by isolation means, for example isolation modules. By the term "isolation" is meant at least a reduction in the amplitude of the vibration through the module between on the one hand the source of vibration, i.e. the device generating vibration, and on the other hand, the structure to be isolated. Thus in certain cases, the isolation module must also enable impacts to be attenuated.

It is known to use isolation means including elements made from viscoelastic material.

However, a problem frequently encountered is the nonlinear behaviour of the isolation means, due in particular to the viscoelastic nature of the material used. Now, the nonlinearity limits the ability to predict the behaviour of the isolation means. Thus, changes in the size, weight and geometry of the launcher and of the satellite make it necessary to revisit the design of the isolation means, which must be developed on a case-by-case basis. Moreover, unexpected events generating vibrations and impacts during the satellite launch phase may have negative effects on the control of the launcher and of the satellite, due in part to the unpredictable behaviour of the isolation means.

As a result, the use of elements made from viscoelastic material in the particular field of satellites is limited.

Novel designs have therefore been proposed for isolation means, reducing the nonlinear behaviour so as to obtain isolation means that are effective for different types of launchers and satellites, the behaviour of which is predictable.

Document U.S. Pat. No. 6,199,801 describes an example of an isolation device in the form of a module. A plurality of modules is placed between the launcher and the satellite in order to ensure their connection. A module behaves like a spring in a vertical direction, but is relatively rigid in the lateral directions. For example, a module is in the form of two metal beams, a shock-absorbent layer made from viscoelastic material being applied to each beam. The two beams are connected together by vertical metal portions. Thus, by making the loads pass through the very stiff vertical metal portions, the modules would gain in linearity. The layers of viscoelastic material have an auxiliary role and are only stressed in order to absorb vibrations in the event of significant deflection of the beams.

However, such a module is found to be very stiff in the lateral directions, making it inadequate to ensure lateral isolation.

Document U.S. Pat. No. 7,249,756 also relates to the problems of nonlinearity of the isolation modules. It proposes to make an isolation module effective in all directions. To this end, the module comprises a central flexure portion and two flexure loops, symmetrical with respect to the central portion. On each face of each loop, a layer of a viscoelastic material and a rigid metal layer are applied successively. The central portion in fact comprises two superimposed sections that can move in relation to each other both longitudinally and laterally. These movements are reflected in the loops, more specifically in the layers of viscoelastic material, which deform under shear due to the rigid layers.

The use of metal parts makes it possible to reduce the problems associated with nonlinear behaviour. However, as before, the lateral flexibility is very low, in any case too low to supply adequate lateral isolation.

Moreover, such a module constituted by a stack of layers proves to be a complex structure. Costs are thereby increased. Moreover, such a structure is bulky and heavy, which is highly undesirable in the field of satellites, where bulk and weight must be minimal. In addition, the use of metal layers necessarily involves the use of layers made from viscoelastic material in order to provide damping, necessarily introducing nonlinearity.

There is a need for a novel isolation module providing in particular a solution to the aforementioned drawbacks.

SUMMARY OF THE INVENTION

Thus, a first subject of the invention is to propose a novel isolation module, the nonlinear behaviour of which is reduced.

A second subject of the invention is to propose a novel isolation module that still has dimensions and weight that are acceptable for an application in the field of satellites.

A third subject of the invention is to propose a novel isolation module having good mechanical strength.

A fourth subject of the invention is to propose a novel isolation module, the behaviour of which is easy to predict.

A first aspect of the invention is to propose an isolation module between a vibration-generating device, such as a satellite launcher, and a structure to be isolated, such as the structure carrying a satellite. The module comprises:

at least two fastening parts intended to be fastened respectively on the vibration-generating device and the structure to be isolated, connecting means made from elastomer material interposed between the two metal parts, allowing at least one degree of freedom in translation along a longitudinal axis (X) between the two metal parts, A first fastening part, called the frame, comprises at least two parallel radial branches at a distance from each other along the longitudinal axis. The second fastening part, called the support, comprises at least one radial branch extending between the two branches of the frame. The two radial branches of the frame are symmetrical with each other with respect to a plane perpendicular to the longitudinal axis.

The connecting means made from elastomer material comprise at least one pair of identical elastomer pads, in which each pad extends along the longitudinal axis between a first end and a second end. Thus, a first pad has its first end supported on a first radial branch of the frame and its second end supported on the radial branch of the support. The second pad has its first end supported on the second radial branch of the frame and the second end supported on the radial branch of the support. The two pads of the pair are thus mounted in parallel between the frame and the support and are active along the longitudinal axis in opposite directions, so that when one pad is working under tension, the other pad of the pair is working under compression and vice-versa.

As a result, the stiffness of the module is symmetrical, whether a force applied thereto along the longitudinal axis is oriented in one direction or the opposite direction.

The module then has a symmetrical behaviour, making it possible to reduce the nonlinearity, optionally with the help of additional provisions.
Each pad is thus dimensioned so that the contact surface of one end in contact with a branch and the free contact surface conforms to the relationship:

$$\frac{S_1}{S_2} \leq 3.$$

Advantageously, the assembly formed by the two fastening parts in parallel has a relative stiffness comprised between 5% and 30% of the total stiffness of the module.

The relative stiffness can be provided by a single one of the two fastening parts, the other fastening part being considered infinitely rigid.

In addition to reducing the nonlinear behaviour, good mechanical strength is provided by selecting the relative stiffness comprised between 20% and 30% of the total stiffness of the module.

Preferably, the module comprises a plurality of pairs of pads made from elastomer.

Each fastening part comprises a fastening surface, suitable for placing in contact directly or indirectly with one or other of the vibration-generating device and the structure to be isolated, the fastening surface of the frame being parallel to the fastening surface of the support.

The fastening surfaces of the two fastening parts can be perpendicular to a fastening axis parallel to the longitudinal axis. As a variant, the fastening surfaces of the two fastening parts are perpendicular to a fastening axis inclined with respect to the longitudinal axis. The angle of inclination of the fastening axis with respect to the longitudinal axis is for example 40°.

Preferably, the fastening location of the frame on one or other of the vibration-generating device and the structure to be isolated and the fastening location of the support to one or other of the structure to be isolated and the vibration-generating device are aligned along the longitudinal axis. For example, the fastening surfaces comprise holes, the axes of which are aligned.

The frame and the support can each have a longitudinal plane of symmetry perpendicular to the radial axis (Y).

According to an embodiment, the frame comprises two upper branches one within the continuous extension of the other and two lower branches, one within the continuous extension of the other. The frame also comprises a longitudinal branch extending in the longitudinal plane of symmetry, the frame forming an H. The support comprises two aligned median branches, one extending toward the other without meeting, the support forming a C, each of the median branches extending between two branches of the frame.

According to another embodiment, the frame comprises two lower branches one within the continuous extension of the other and two upper branches, one within the continuous extension of the other, extending on either side of the two longitudinal branches. The two lower branches have an opening. The support is in the shape of a T, and comprises two median branches extending on either side of a central longitudinal branch passing through the opening of the frame, so that the median branches extend between the branches of the frame.

According to a second aspect, the invention proposes an application of an isolation module as presented above, in which the vibration-generating device is a launcher for an artificial satellite and the structure to be isolated is the structure carrying an artificial satellite.

For example, the satellite launcher comprises a circular launcher interface ring and the carrying structure comprises a circular satellite interface ring. A plurality of isolation modules is mounted between the interface rings. The frame of each module is rigidly fastened respectively on one or other of the launcher interface ring or the satellite interface ring and the support of each module being rigidly fastened respectively on one or other of the satellite interface ring or the launcher interface ring. Each module is arranged so that its longitudinal axis is parallel to the longitudinal axis of the other modules.

BRIEF DESCRIPTION OF THE FIGURES

Of course, other advantages and features of the invention will become apparent on examination of the detailed description of possible embodiments, presented hereinafter, and of the attached figures in which.

DETAILED DESCRIPTION OF THE DRAWINGS

Figure 1:
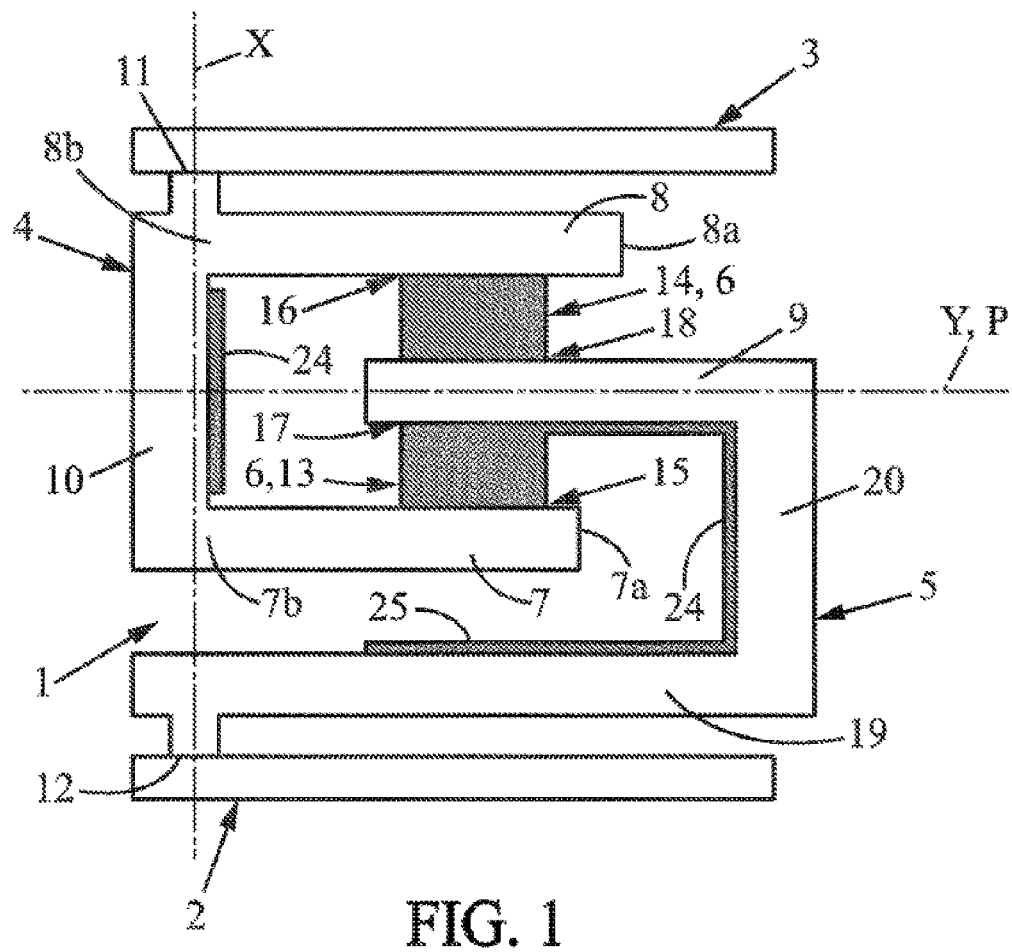
FIG. 1 is a side view of an isolation module shown diagrammatically, according to a first embodiment.

FIG. 1 shows diagrammatically a simplified isolation module 1, intended to be mounted between a vibration-generating device and a structure to be isolated. For example, the module can be mounted at the interface between a satellite interface ring 2, fastened to the launcher, and a launcher interface ring 3, fastened to the satellite.

The isolation module 1 comprises at least two fastening parts 4, 5, intended to be fastened, directly or indirectly via interface rings 2, 3, to the vibration-generating device and to the structure to be isolated, respectively. Connecting means 6 made from elastomer material are interposed between the two fastening parts 4, 5, and allow at least one degree of freedom in translation along a longitudinal axis X between the two fastening parts 4, 5.

Generally, a first part 4 is called the frame, and comprises at least two branches 7, 8, that are radial, i.e. extending parallel to a radial axis Y of the module 1. The two radial branches 7, 8 of the frame 4 are at a distance from each other along the longitudinal axis X.

For the purpose of simplification, but non-limitatively, a first branch 7 of the frame 4 is called lower and the second branch 8 is called upper, with reference to the natural orientation of FIGS. 1 to 8, in which the axis X is the vertical axis and the axis Y is the horizontal axis.

Hereinafter, the adjective "longitudinal" relates to any direction parallel to the longitudinal axis X and the adjective "radial" relates to any direction parallel to the radial axis Y.

The second part 5 is called the support, comprises at least one branch 9, called the median branch, extending between the two branches 7, 8 of the frame 4. Thus, in a plane parallel to the axes X and Y, as in FIG. 1, the lower branch 7 of the frame 4, the median branch 9 of the support 5 and the upper branch 8 of the frame are shown in succession.

The frame 4 and the support 5 can be made from any metal or alloy material, for example aluminium, steel or titanium, but also from composite materials such as carbon or kevlar. The frame 4 can be made in a material different from the support 5.

The two radial branches 7, 8 of the frame 4 are such that they are symmetrical with each other with respect to a median plane P perpendicular to the longitudinal axis X, the median branch 9 of the support 5 extending in this plane when the module 1 is inactive, i.e. when it is not subject to any stress. Thus, the radial branches 7, 8 of the frame 4 are symmetrical in stiffness, under tensile and compressive deflection. More specifically, as explained below, this is when the module 1 is subject to a force along the longitudinal axis X, in one direction or in the other, the two branches 7, 8 are stressed in a self-symmetrical manner: a branch 7, 8 flexes in one direction when a force in a first direction along the longitudinal axis X is applied to the module, and flexes in the opposite direction, in a symmetrical manner, when a force in the other direction along the longitudinal axis X is applied to the module 1.

The two radial branches 7, 8 of the frame 4 are connected by a longitudinal branch 10. Each of the two radial branches 7, 8 then have one end, respectively 7a, 8a free and one end, respectively 7b, 8b, fixed to the longitudinal branch 10. The free ends 7a, 8a are arranged symmetrically with respect to each other along the median plane P and the fixed ends 7b, 8b are arranged symmetrically with respect to each other along the same median plane P.

Each fastening part, respectively 4, 5, has a fastening surface, respectively 11, 12. For example, the fastening surface 11 of the frame 4 is intended to be applied against a face of the launcher interface ring 3 fastened to the satellite, and the fastening surface 12 of the support 5 is intended to be applied against a face of the satellite interface ring 2 fastened to the launcher. For example, the parts 4, 5 are fastened by means of threaded fasteners inserted through the fastening surface 11, 12 and distributed regularly over the fastening surface 11, 12. The fastening surfaces 11, 12 are perpendicular to a single fastening axis, which may be merged, as in the example of FIG. 1, with the longitudinal axis X.

The connecting means 6 made from elastomer material comprise at least one pair of elastomer pads 13, 14 which are identical, i.e. each pad 13, 14 has the same tensile stiffness and the same compressive stiffness. Preferably, the height of the pads 13, 14, i.e. their dimension along the longitudinal axis X, is equal when the module 1 is not stressed.

Each pad, respectively 13, 14, extends along the longitudinal axis X between a first end, respectively 15, 16, and a second end, respectively 17, 18. A first pad 13 has its first end 15 rigidly fastened to the lower branch 7 of the frame 4 and its second end 17 rigidly fastened to the median branch 9 of the support 5. In a symmetrical manner, the second pad 13 has the first end 16 rigidly fastened to the upper branch 8 of the frame 4 and second end 17 rigidly fastened to the median branch 9 of the support 5. The pads 13, 14 are thus mounted in parallel between the frame 4 and the support 5 and are active along the longitudinal axis X in opposite directions. In other words, when a pad 13, 14 works under tension, the other pad 14, 13 of the pair works under compression, and vice-versa. Preferably, the pads 13, 14 of the pair are aligned with each other in the longitudinal direction.

According to the example of FIG. 1, the two parts 4, 5 are substantially identical, in the shape of a C. The support 5 then comprises a second radial branch 19, called a stop, which extends facing the lower branch 7 of the frame 4, at a distance along the longitudinal axis X, preferably less than the height of the pads 13, 14. As for the frame 4, the radial branches, respectively 9, 19 of the support 5 then have one free end, respectively 9a, 19a and one end, respectively 9b, 19b, fixed to a longitudinal branch 20. The fastening surface 11 of the frame 4 projects from the upper branch 8, and the fastening surface 12 of the support 5 projects from the second radial branch 19. The two fastening surfaces 11, 12 are each situated within the extension of the longitudinal branch 10 of the frame 4. The stop 19 of the support 5 is not in contact with the pads, but can come into contact with the lower branch 7 of the frame 4, for example in the case of impact, as will be explained below.

This is then described as tensile and compressive symmetry for the module 1 thus formed, because the module 1 behaves in a self-symmetrical manner, whether a longitudinal force F is applied thereto in one direction or in the opposite direction.

More specifically, when a force F is applied along the longitudinal axis X, for example downward according to FIG. 1, i.e. on the satellite and directed toward the launcher, the frame 4 moves along the longitudinal axis X, so that the lower branch 7 of the frame 4 stretches the first pad 13, and the upper branch 8 compresses the second pad 14 against the median branch 9: the first pad works under compression while the second pad works under tension. In addition, the result of this is that the lower branch 7 is put under stress by the compressed pad 14 and the upper branch 8 is put under stress by the stretched pad 13, so that the two branches 7, 8 are subject to loads tending to make them flex in the same longitudinal direction, in this case in the opposite direction to that of the force F.

When a force is applied on the satellite 3 and directed in the opposite direction, i.e. upward in FIG. 1, then the lower branch 7 of the frame 4 compresses the first pad 13 against the first median branch 9 of the support 5, and the upper branch 8 stretches the second pad 14: the first pad 13 works under tension while the second pad 14 works under compression. Thus the result of this is that the upper branch 8 is put under stress by the compressed pad 13, the lower branch 7 being put under stress by the stretched pad 14. Here again, the two branches 7, 8 are subject to loads tending to make them flex in the same longitudinal direction, in the opposite direction to that of the force F applied to the module 1.

The structure of the isolation module 1 thus formed, in particular with the pads 13, 14 arranged in parallel, and the symmetrical radial branches of the frame, ensures that the loads along the longitudinal axis X pass through the pads 13, 14 and the radial branches 7, 8 of the frame 4, so that the module 1 has a symmetrical behaviour regardless of the direction of the load applied to the module 1 along the longitudinal axis X. More specifically, it is the stiffness of the module 1 that is symmetrical, whether a longitudinal force applied to the module is oriented in one direction or the opposite direction.

However, the pads 13, 14 have a nonlinear behaviour, inherent in the very nature of the elastomers of which it is composed, in particular their viscoelastic properties. More specifically, the stiffness of a compressed pad increases while the stiffness of a stretched pad decreases. The symmetrical working of the pads 13, 14 under tension and under compression, due to the structure of the module 1, makes it possible to reduce the nonlinear behaviour. In fact, the increase in the stiffness of the compressed pad is partially offset by the reduction in the stiffness of the stretched pad. The behaviour of the module 1 for the applications in the envisaged field of satellites is thus considered to be linear, or quasi-linear.

The increase in the stiffness of a compressed pad is in reality not totally compensated for by the reduction in the stiffness of a pad under tension. Indeed, the more a pad is compressed, the greater the load to be applied in order to compress it further. Thanks to the symmetrical design of the module 1, additional provisions can advantageously be implemented in order to enhance the reduction in nonlinearity.

As the pads 13, 14 are mounted in parallel, their respective stiffnesses are added together. There is therefore a compressive load threshold after which a pad made from viscoelastic material has a highly nonlinear behaviour owing to the increase in the stiffness of the compressed pad which is not compensated for by the stretched pad, so that the overall behaviour of the module 1 is unsuitable for satellite applications. In other words, the greater the loads applied to the module 1, the more nonlinear effects will become apparent.

In order to limit the nonlinear behaviour in the module 1, the dimensions of the pads 13, 14 are selected so that their shape is flattened according to the longitudinal axis X. In fact, the nonlinear effects have a tendency to become even greater as the strain rate of the pads increases. Now, the strain rate itself tends to increase when the height of the pad decreases. Thus, the greater the height of the pad, the more its nonlinear behaviour will be reduced, i.e. the range of forces and movement for which the behaviour of the module may be considered as linear or quasi-linear is greater.

However, the height of the pads 13, 14 must at the same time allow relative movement along the longitudinal axis X between the frame 4 and the support 5. Now, it has been observed that the flatter the shape of a pad, the more its stiffness increases, so that the isolation function of the pad is reduced.

Based on these two compromises, denoting the surface of a pad in contact with one or other of the branches 7, 8 or 9 of the parts frame 4 or support 5 as S1, and the free surface of the pad as S2, it was determined that the dimensions of each pad 13, 14 must satisfy the following relationship:

$$\frac{S_1}{S_2} \leq 3 \tag{1}$$

When the dimensions of the pads satisfy the relationship (1), the nonlinear effects are greatly reduced for most of the applications relating to the isolation of the satellites vis-à-vis their launcher. In such applications, the component of the force along the longitudinal axis X applied to a module is generally comprised between 20,000 N and 30,000 N (Newtons).

According to an example, each pad 13, 14 is in the shape of a parallelepiped with a square base extending along the longitudinal axis X, with the sides of the base being 60 mm (millimeters) and the height, i.e. the dimension along the longitudinal axis X, is 5 mm.

Preferably however, the dimensions of each pad 13, 14 satisfy the following relationship:

$$\frac{S_1}{S_2} \leq 1.6 \tag{2}$$

The nonlinearity is thus significantly reduced for the applications envisaged in the field of satellites.

For example, as in the previous example, each pad is in the shape of a parallelepiped with a square base extending along the longitudinal axis X, with the sides of the base measuring 50 mm in the direction along the transverse axis Y, 69 mm in the other direction, and the height of which is 22 mm.

Figure 5:
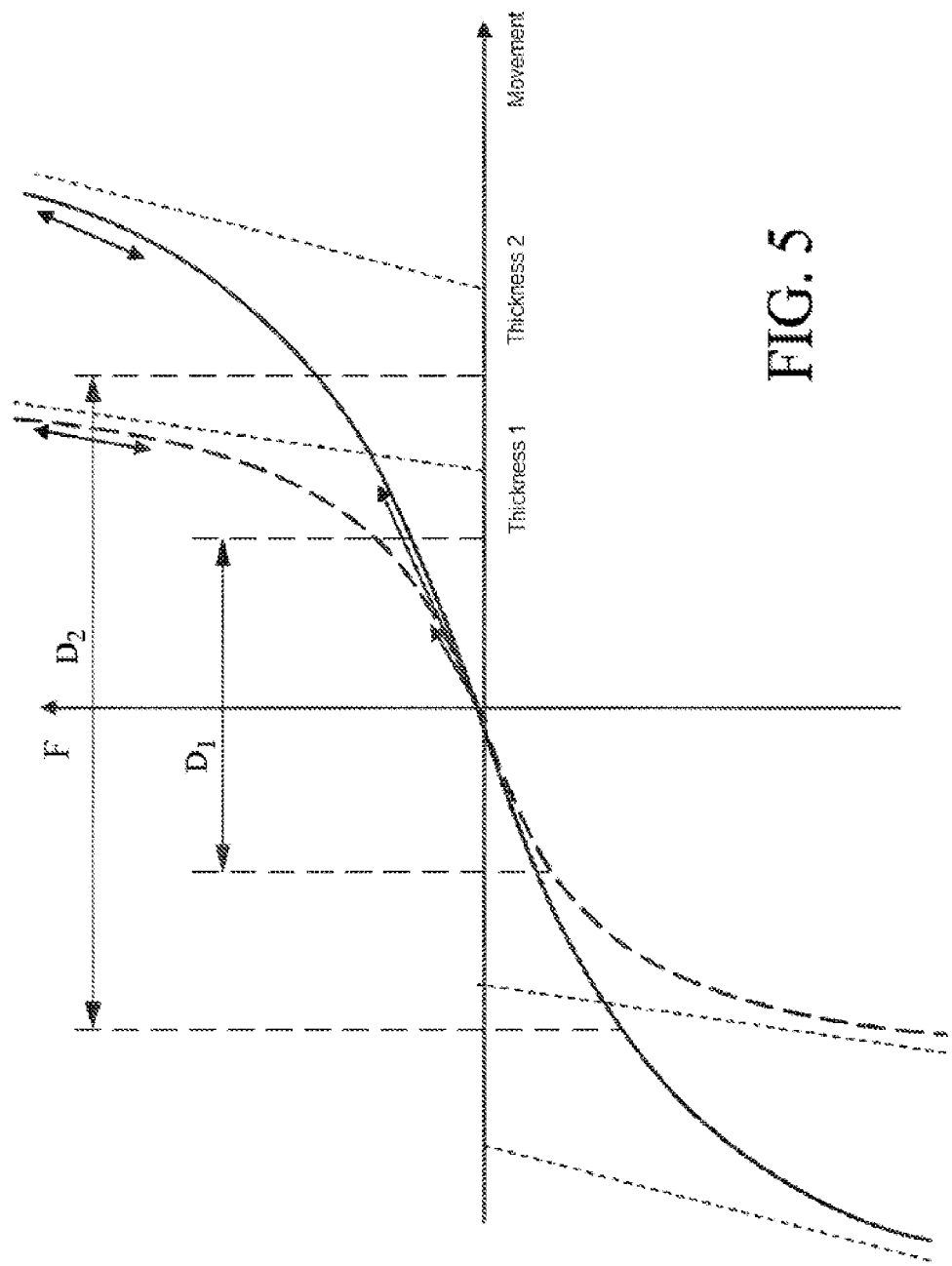
FIG. 5 is a diagram showing, for two modules the characteristics of which are different, the change in deflections in operation.

FIG. 5 compares the behaviour by the relative movement of the fastening parts 4, 5 as a function of an applied force F, for two modules having pads of different dimensions, the curve in broken lines relating to a first module the height h of the pads of which is less than that of a second module to which the curve in a solid line relates: the first module does not conform to the relationship (1), while the second module does conform to it.

Thus, for the first module, the range D1 of the movements for which the behaviour can be close to linear, called linearity range, is less than that of D2 of the second module, the module according to the invention.

The symmetrical behaviour contributes to the increase in the linearity range. In fact, if the behaviour is not symmetrical, then the module does not behave in the same manner depending on the orientation of the loads along the longitudinal axis which are applied thereto, and the range of movements of the module in which the behaviour can be considered as linear is reduced, either for movements in one direction or in the other direction along the longitudinal axis X.

In order to reduce the nonlinear component even further, the frame 4 and the support 5 form an assembly for which a relative stiffness is defined that is comprised between 5% and 30% of the total stiffness of the module 1.

The stiffness is a variable conventionally measured using a dynamometer or a tensile testing machine. A known movement is imposed on the part the stiffness of which it is desired to measure, and a piezo-electric cell or strain gauges measure the force F necessary to obtain the movement.

In the case of elastomer pads of a non-constant stiffness, the curve characterizing the change in the stiffness is predicted by finite element analysis software such as MARC or ABAQUS. The stiffness may then be defined as the ratio of a force to a corresponding movement. For each pad, the stiffness can be defined for a small variation in movement and of the force about a point of the curve or as the average stiffness over a full range of movements and forces.

For a module 1, the total stiffness $K_T$ corresponds to the following sum:

$$\frac{1}{K_T} = \frac{1}{K_P} + \frac{1}{K_R} \quad (3)$$

In fact, as the pads 13, 14 are in parallel, their stiffnesses are added together in order to form the stiffness $K_P$ representative of the contribution of the elastomer pads 13, 14 to the total stiffness of the module. As the fastening parts 4, 5 are in series, the inverse of their stiffnesses is added together in order to form $K_R$ representative of the contribution of the fastening assembly 4, 5 to the total stiffness of the module 1. The pads 13, 14 are mounted in series with the frame 4 and the support 5, for example made of metal, so that the inverse values of the stiffness $K_P$ of the pads on the one hand and of the stiffness $K_R$ of the fastening assembly 4, 5 on the other hand are added together to give the inverse of the total stiffness $K_T$. In other words, the module 1 can be modelled as two springs in series, a first spring of stiffness $K_P$ and another spring of stiffness $K_R$.

The stiffness $K_R$ of the parts 4, 5 is then defined as being the relative stiffness.

Thus, for example, when the relative stiffness $K_R$ is considered as contributing 20% of the total stiffness $$K_T, K_R = \frac{K_T}{0.2}$$

is obtained.

In other words, returning to the formula (3), it is found that the total stiffness $K_T$ is equal to $(1-0.2) \times K_P$, or again, that the stiffness $K_P$ of the pads has the value of $1.25 \times K_T$. Therefore, the pads 13, 14 are 25% stiffer than the complete module 1.

Therefore, in this example, for a total stiffness $K_T$ of 2,000 N/mm (Newton millimeters), the stiffness $K_P$ of the pads 13, 14 is 2,500 N/mm and the relative stiffness $K_R$ is 10,000 N/mm.

By adjusting the relative stiffness $K_R$ of the fastening assembly formed by the frame 4 and the support 5, the nonlinear behaviour can be reduced even further. For example, the relative stiffness of the fastening assembly 4, 5 can be adjusted by using a material for the frame 4 having a rigidity that is much greater than that of the support 5, so that only the support 5 is substantially deflected when the module 1 is subject to loads: the stiffness of the frame 4 is considered infinite. The stiffness of the support 5 can moreover be adjusted by controlling the length, i.e. the radial dimension, of the median branch 9 of the support 5, as well as the thickness, i.e. the radial dimension, of the longitudinal branch 20. In fact, the longer the median branch 9, the more it can be flexed along the longitudinal axis X. Moreover, the greater the thickness of the longitudinal branch 20, the greater its stiffness, so as to limit the deflections of the support 5 elsewhere than through the median branch 9. Thus, when the module 1 is subject to a force which compresses one or other of the pads 13, 14 of the pair, the median branch 9 of the support 5 can flex in order to avoid the nonlinear behaviour of the compressed pad becoming too great for applications relating to the isolation of a satellite installed on a launcher, which are those mainly envisaged herein.

However, in order to ensure good mechanical strength of the module, the relative stiffness $K_R$ of the fastening assembly 4, 5 must be sufficient in order in particular to avoid too great deflections of the module 1, which would result in stresses on the satellite and/or the launcher capable of damaging them. Thus, preferably, the relative stiffness of the assembly formed by the frame 4 and the support 5 is comprised between 20% and 30% of the total stiffness $K_T$ of the module 1.

Thus, when the compressive load threshold of one of the pads 13, 14 is reached, the module 1 can still be deflected in the direction of compression of the pad in question via the deflection of the median branch 9 of the support 5.

Figure 2:
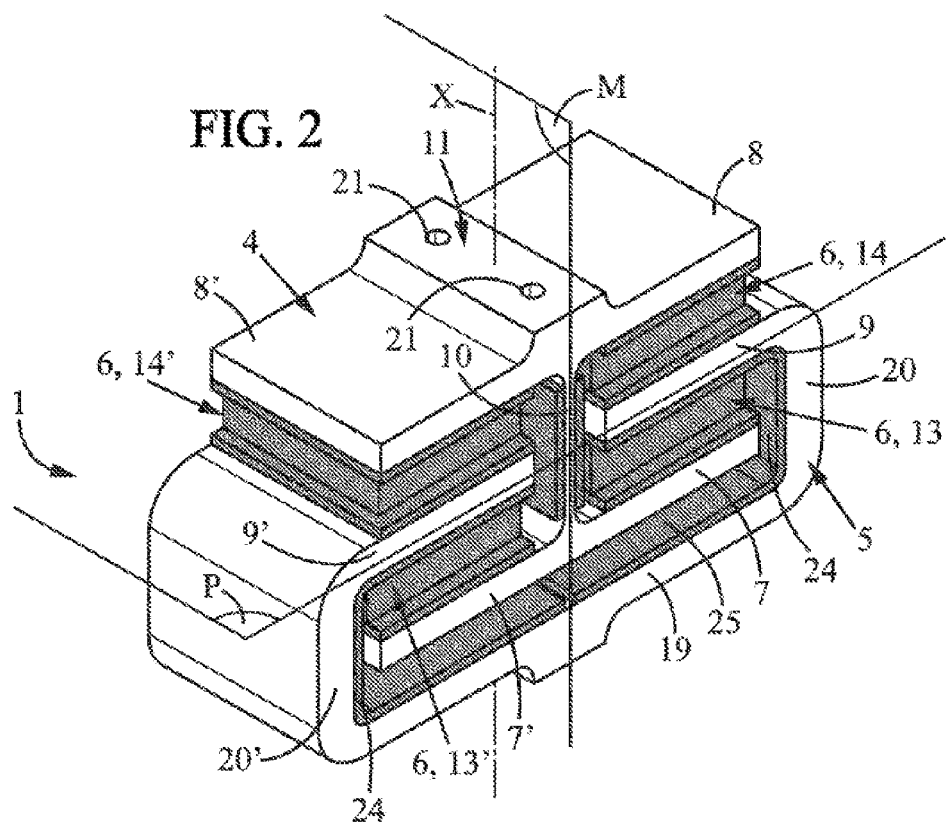
FIG. 2 is a three-dimensional view of an isolation module according to a second embodiment.

FIG. 2 shows an isolation module 1 according to a second embodiment.

The module 1 of the second embodiment corresponds to two modules 1 from the first embodiment when the longitudinal branch 10 of the frame 4 has been made common. In other words, the module 1 of the first embodiment has a plane of symmetry M perpendicular to the radial axis Y, the longitudinal branch 10 of the frame 4 extending in this plane M. The same elements as those described with reference to FIG. 1 are denoted here by the same references, to which "'" has been added in order to denote their symmetry with respect to the plane M.

The second embodiment has in particular the advantage of not generating torque in the fastening means of the two fastening parts 4, 5.

According to the second embodiment, the frame 4 is in the shape of an H, and comprises two lower branches 7, 7' each within the continuous extension of the other, extending respectively on either side of the longitudinal branch 10. Similarly, the frame 4 comprises two upper branches 8, 8' each within the continuous extension of the other, and also extending respectively on either side of the longitudinal branch 10. The lower branches 7, 7' are then still symmetrical with the upper branches 8, 8' of the frame in a median plane P perpendicular to the longitudinal axis X.

As for the support 5, it is in the shape of a C, being fitted between the radial branches 7, 7' and 8, 8' of the frame 4. More specifically, the support 5 comprises two median branches 9, 9', extending towards each other without meeting, and two longitudinal branches 20, 20' extended by the stop 19, closing the C of the support 5. The median branches 9, 9' extend in the median plane P when the module 1 is inactive.

The module 1 then comprises two pairs of pads 13, 14 and 13', 14', namely a first pair of pads 13, 14 fastened in parallel to the radial branches 7, 8 of the frame 4 and to a first median branch 9 of the support 5, situated on the same side of the longitudinal branch 10, and a second pair of pads 13', 14' fastened in parallel to the other radial branches 7', 8' of the frame 4 and to the other median branch 9' of the support 5, situated on the other side of the longitudinal branch 10.

The fastening surfaces 11, 12 are centred with the longitudinal branch 10 of the frame 4. More specifically, the fastening surface 11 of the frame 4 projects from the lower branches 7, 7', and the fastening surface 12 of the support 5 projects from the stop 19 of the support 5. The fastening surfaces 11, 12 comprise holes 21, the axes of which are parallel with the longitudinal axis X, and pass through the plane of symmetry M in which the longitudinal branch 10 extends. Thus, when a load is applied along the longitudinal axis X, it is transmitted equally on either side of the longitudinal branch 10 of the frame 4, so that the fastening means of the fastening parts 4, 5 are not, or are only slightly, subject to a torque.

Generally, the module 1 can comprise a plurality of pairs of pads, the pads of each pair being mounted in parallel, so that for each pair of pads, there is always one pad under tension and one pad under compression when the module 1 is stressed.

The module 1 is obtained for example by coating the frame 4 and the support 5 with an adhesive intended to adhere to the elastomer of the pads. More specifically, at least the faces of the radial branches 7, 8 intended to be fastened to the first ends 15, 16 of the pads 13, 14 and the faces of the median branch 9 of the support intended to be fastened to the two ends 17, 18 of the pads 13, 14 are coated with this adhesive. The frame 4 and the support 5 are placed in a mould, the temperature of which is controlled, for example heated to 150° C. The elastomer is injected into the mould and then vulcanized. The adhesive reacts with the elastomer in order to ensure the fastening.

As a variant, the longitudinal axis X can be an axis of rotational symmetry. The module 1 then has a configuration called axisymmetric, the pads 13, 14 being in the form of rings, continuous or not continuous, centred on the longitudinal axis X.

Figure 6:
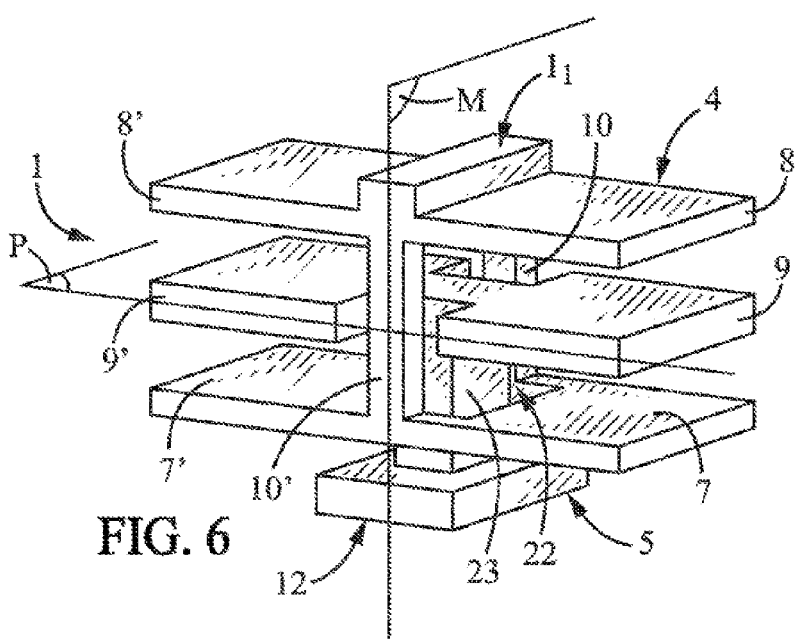
FIG. 6 is a three-dimensional view of an isolation module according to a third embodiment, the elastomer pads being omitted.
Figure 3:
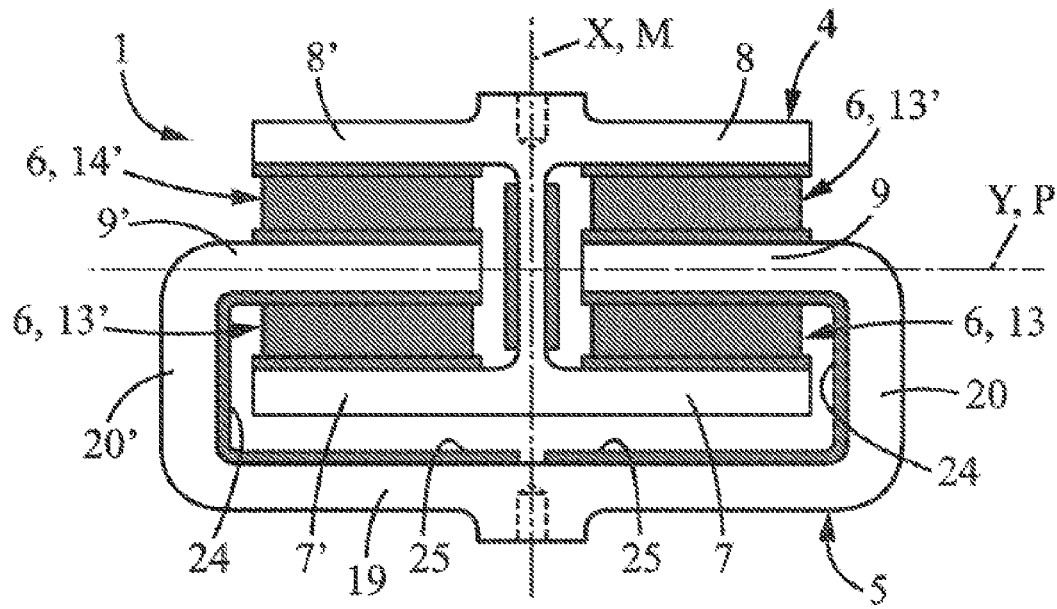
FIG. 3 is a side view of the module in FIG. 2.
Figure 4:
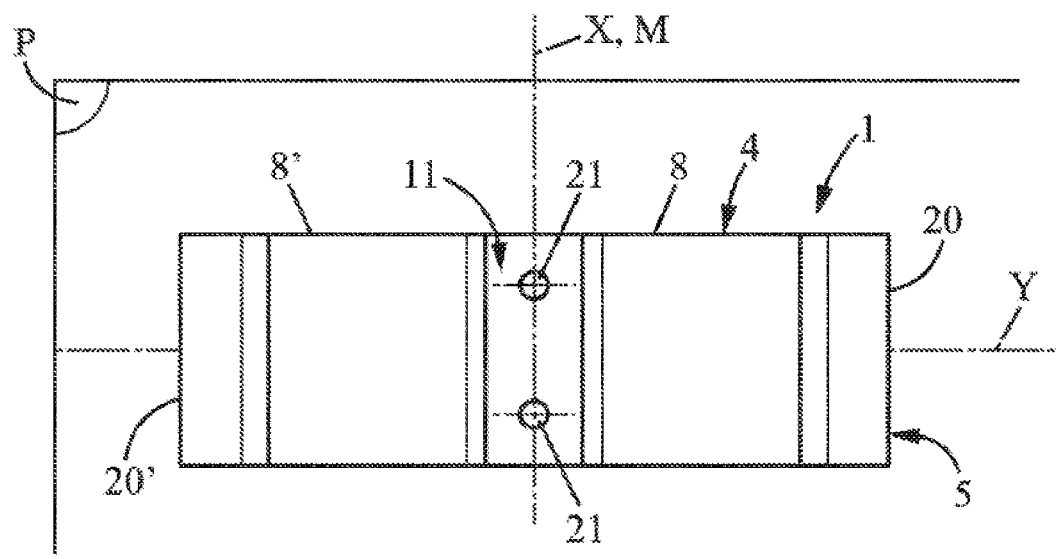
FIG. 4 is a top view of the module in FIG. 2.

FIG. 6 shows a third embodiment for the frame 4 and the support 5. As before, the same references denote the same elements as those of the first and second embodiments.

The frame 4 comprises as before two lower branches 7, 7' and two upper branches 8, 8' the lower branches 7, 7' being symmetrical with the upper branches 8, 8' with respect to a median plane P perpendicular to the longitudinal axis X. The frame comprises two longitudinal branches 10, 10', at the junction between the two lower branches 7, 7' and the two upper branches 8, 8', so that the two lower branches 7, 7' and the two upper branches 8, 8' extend on either side of the longitudinal branches 10, 10'. The two longitudinal branches 10, 10' are arranged on either side of the radial branches 7, 7', 8, 8' in a direction perpendicular to the longitudinal axis X and to the radial axis Y. An opening 22 is formed between the two branches 8, 8'.

The support 5 is in the shape of a T, and comprises two median branches 9, 9', and a central longitudinal branch 23, so that the median branches 9, 9' extend on either side of the central branch 23.

The central branch 23 of the support 5 passes through the opening 22 in the second radial branch 14, 14' of the support, so that the median branches 9, 9' of the support extend between the radial branches 7, 7' and 8, 8' of the frame 4. The frame 4 and the support 5 can then have relative movement along the longitudinal axis X.

The pairs of pads, not shown in FIG. 6, are mounted as before, namely for a first pair, a first pad is mounted between a lower branch 7 of the frame 4 and a median branch 9 of the support 5 and the second pad is mounted between an upper branch 8 of the frame 4 and the same median branch 9 of the support 5, and for the second pair, a first pad is mounted between the other lower branch 7' of the frame 4 and the other median branch 9' of the support 5 and the second pad is mounted between the other upper branch 8' of the frame 4 and the same other median branch 9' of the support 5.

Thus, the module 1 according to the third embodiment also has a symmetry between the lower branches 7, 7' on the one hand, and the upper branches 8, 8' on the other hand, of the frame 4 with respect to a plane perpendicular to the longitudinal axis X, the median branches 9, 9' extending in this plane when the module 1 is inactive, i.e. not stressed. The module 1 of the third embodiment has advantageously, as for the module 1 of the second embodiment, a plane of symmetry M perpendicular to the transverse axis Y, the longitudinal branches 10, 10' extending in this plane M, in order to reduce the torque on the fastening means.

Figure 7:
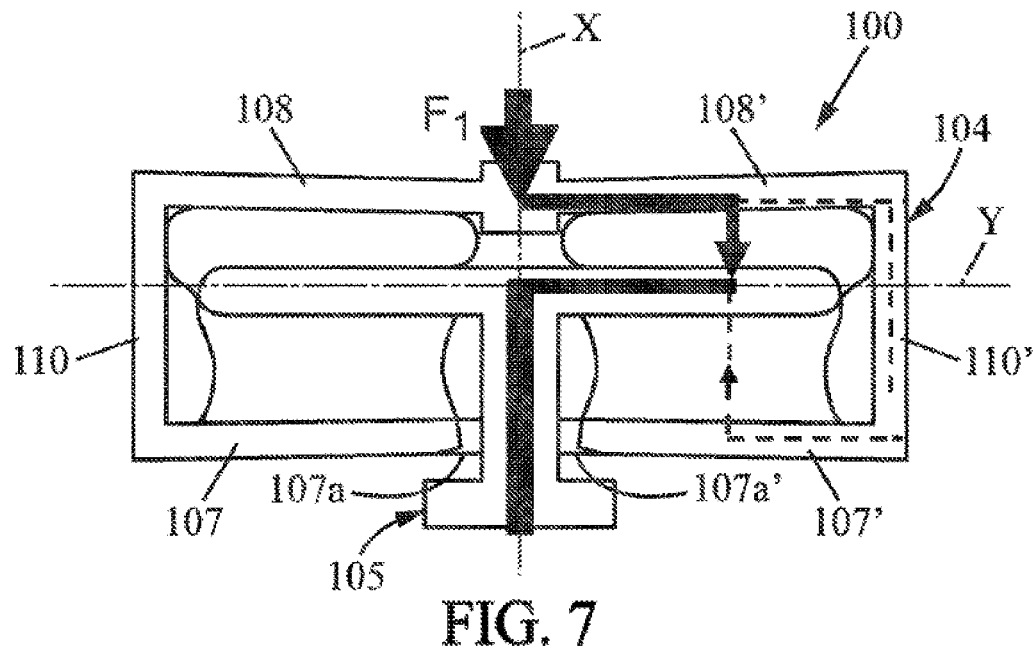
FIGS. 7 and 8 are side views of an isolation module not according to the invention, under two different stress conditions respectively.
Figure 8:
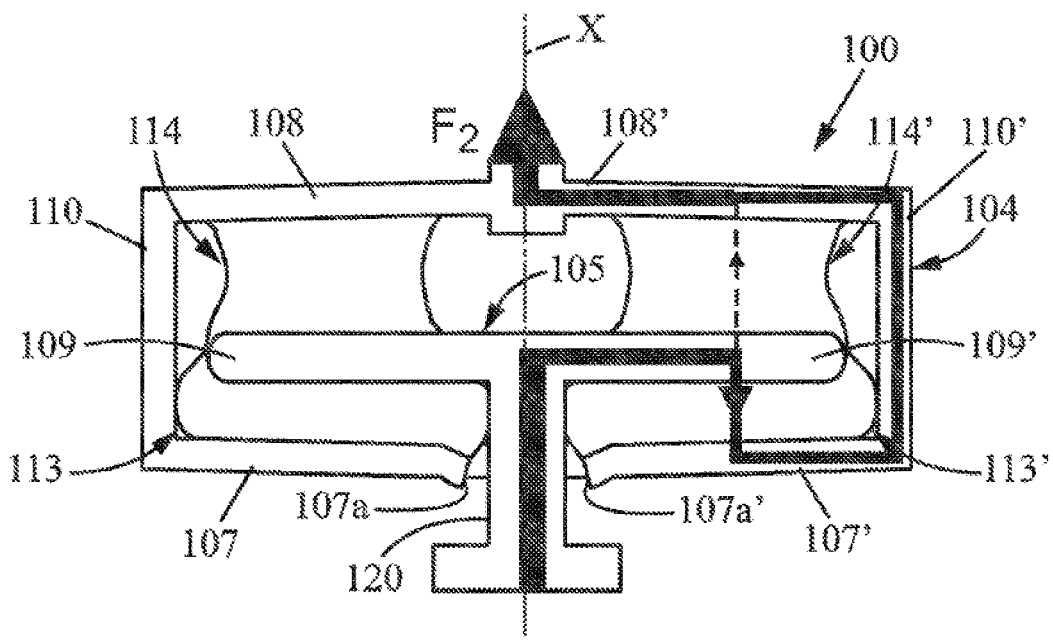

FIGS. 7 and 8 show an isolation module 100 close to that of the second embodiment, but without the required symmetry: the module 100 in FIGS. 7 and 8 corresponds to two modules 1 from the first embodiment, symmetrical along the longitudinal branch 20 of the support 5. The frame 104 then has two lower branches 107, 107' and two upper branches 108, 108'. The two branches 108, 108' are each within the extension of the other, so as to form a single branch the two ends of which are connected to longitudinal branches 110, 110'. The lower branches 107, 107' extend toward each other, each from a longitudinal branch 110, 110', however without meeting. Each lower branch 107, 107' thus has a free end 107a, 107a', a space being retained between these two ends 107a, 107a'. However, the upper branches 108, 108' do not have a free end. The support 105 is in the shape of a T, the longitudinal branch 120 of which passes through the space between the two lower branches 107, 107' of the frame 104, so that the median branches 109, 109' of the support 5 extend between the lower branches 107, 107' and the upper branches 108, 108' of the frame 104. Thus, the module 100 of FIGS. 7 and 8 has a plane of symmetry perpendicular to the radial axis Y, but has no plane of symmetry perpendicular to the longitudinal axis X.

In FIG. 7, arrows represent the path of the loads in the module 100 when a force F1 is applied along the longitudinal axis X so that the first pads 113, 113' are under tension, i.e. stretched. Only the path on one side of the plane of symmetry of the module 100 is represented, the path on the other side being obtained by symmetry. The loads preferentially take the path of greatest stiffness. Now, in module 100, the loads have a choice between two paths: either to pass via the pads, or to pass via the frame 104. As the pads under compression have the greatest stiffness, the loads preferentially pass via the second pads 114, 114' under compression. The arrow shown as a solid line in FIG. 8 indicates the path preferentially taken, for example by 70% of the total loads, and the arrow shown in a broken line indicates the second path, passing through the frame 4.

Similarly, FIG. 8 shows the path taken by the loads for a force F2 applied to the module 100 along the longitudinal axis X, in the other direction, so that the second pads 114, 114' are under tension.

In the case where the second pads 114, 114' are under compression (FIG. 7) the loads mainly pass via the second pads 114, 114' before reaching the longitudinal branch 120 of the support 105.

In the case where the first pads 113, 113' are under compression (FIG. 8) the loads mainly pass via the branches 110, 110' of the frame 104.

Thus, the path of the loads is not symmetrical depending on the direction of the force F1 or F2 applied to the module 100 along the longitudinal axis X, in particular due to the absence of symmetry between the radial branches 107, 107', 108, 108' of the frame 104 with respect to a plane perpendicular to the longitudinal axis X.

Figure 9:
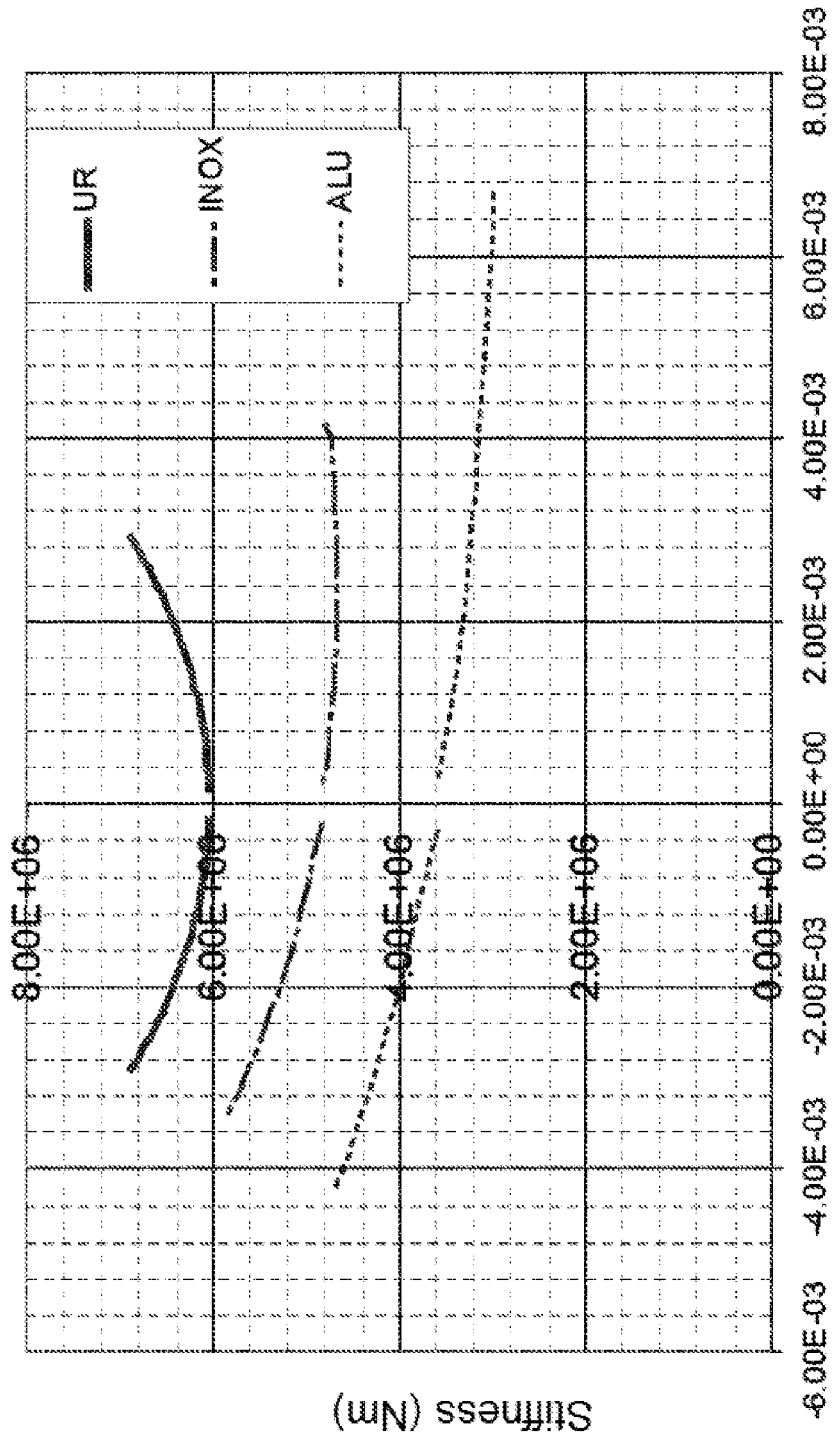
FIG. 9 is a diagram relating to the stiffness of the module in FIGS. 7 and 8 as a function of the deflection of the pads.

FIG. 9 shows this absence of symmetry for three different metal materials of which the frame 4 and the support 5 are composed, i.e. for different stiffnesses:

UR: steel considered as infinitely rigid,
ALU: aluminium,
INOX: stainless steel.

For each of the three materials used, the change in the stiffness (in N/m) is measured as a function of the relative movement of the frame 104 with respect to the support 105.

The stiffness changes in a non-symmetrical manner and increasingly so, the lower the stiffness of the material used.

Figure 10:
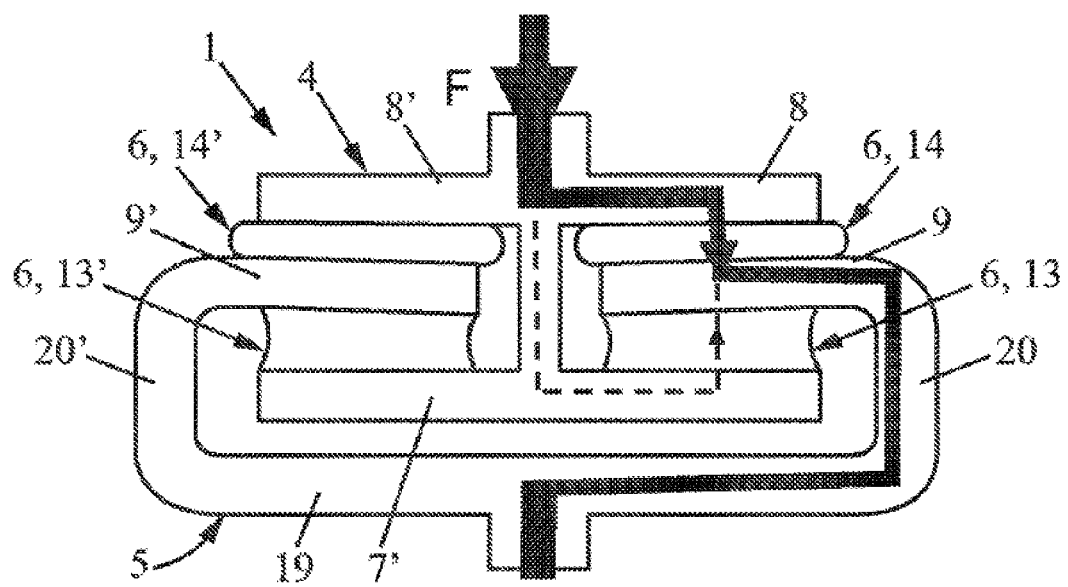
FIGS. 10 and 11 are similar to those in FIGS. 7 and 8 for the isolation module in FIG. 2.
Figure 11:
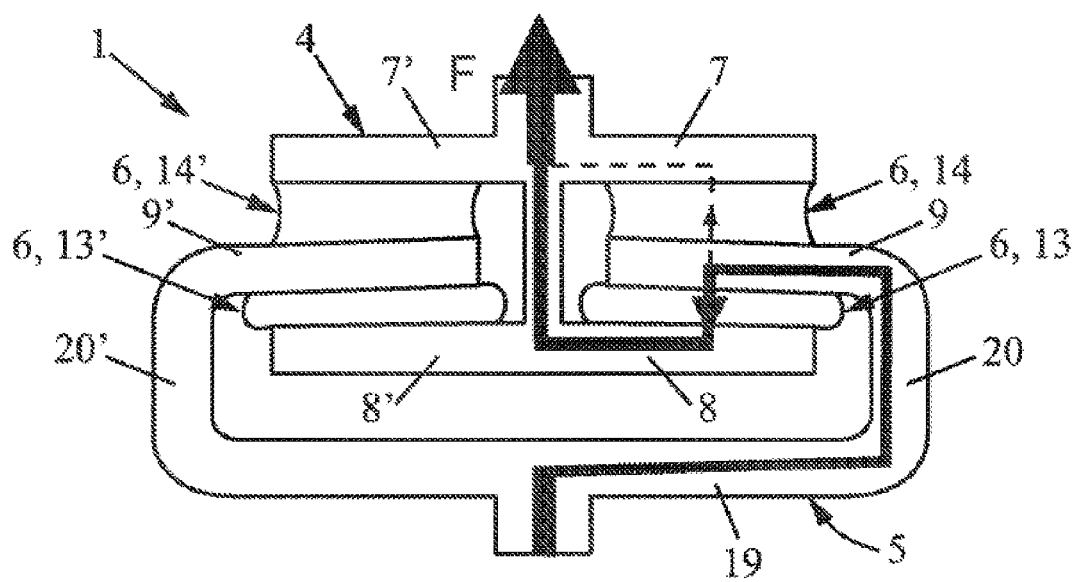

FIGS. 10 and 11 are similar to FIGS. 7 and 8, for a module 1 according to the second embodiment. As in FIGS. 7 and 8, FIG. 10 shows the main path of the loads as a solid line and the secondary path as a broken line when the first pads 13, 13' are under tension, and FIG. 11, when the second pads 14, 14' are under tension.

In both cases, the loads mainly take the path passing via the longitudinal branches 20, 20' of the support 5. Thus, the path of the loads in one case is substantially symmetrical with that in the other case.

Figure 12:
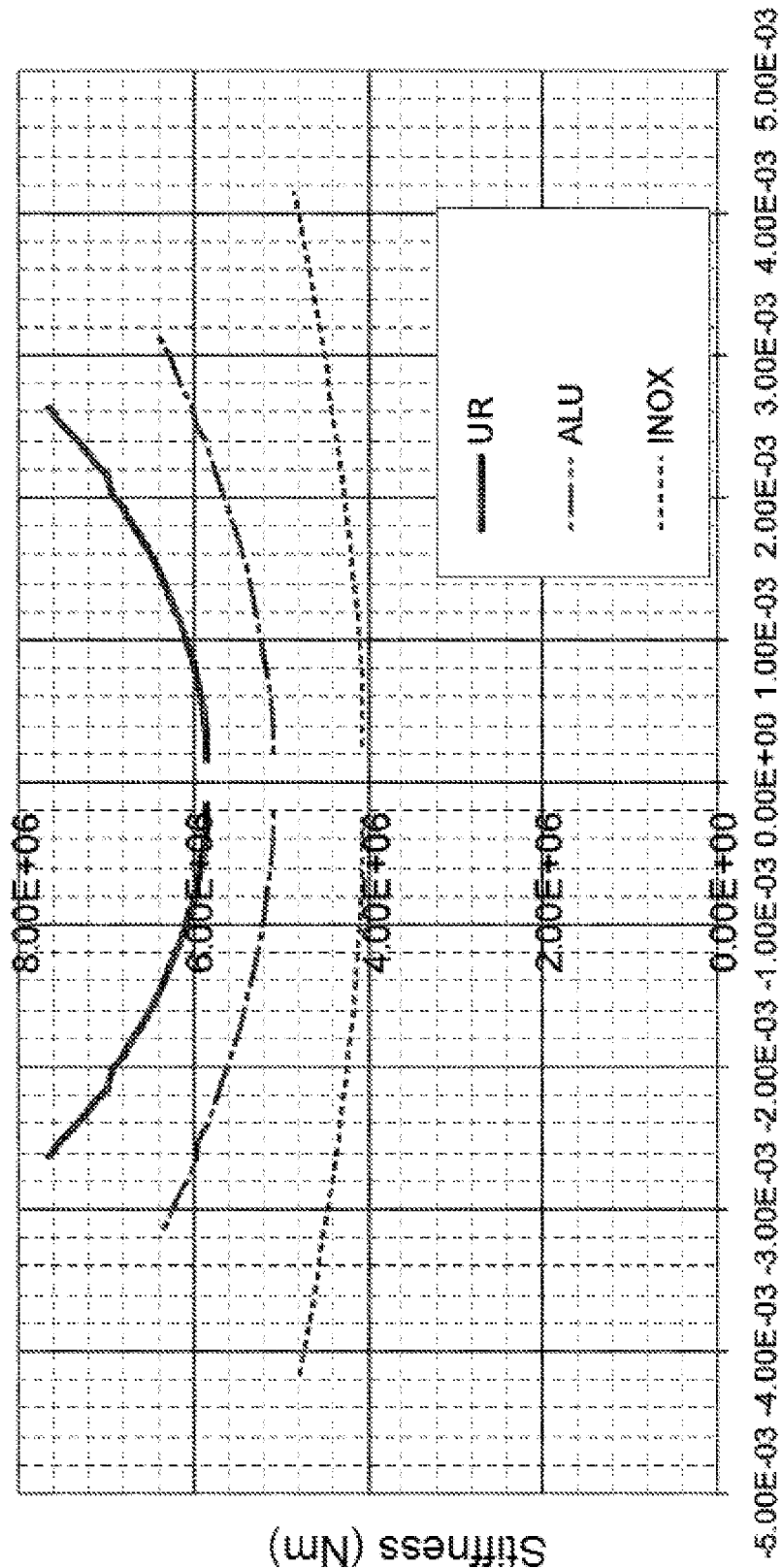
FIG. 12 is a diagram similar to that in FIG. 10 for the module in FIGS. 7 and 8.
Figure 14:
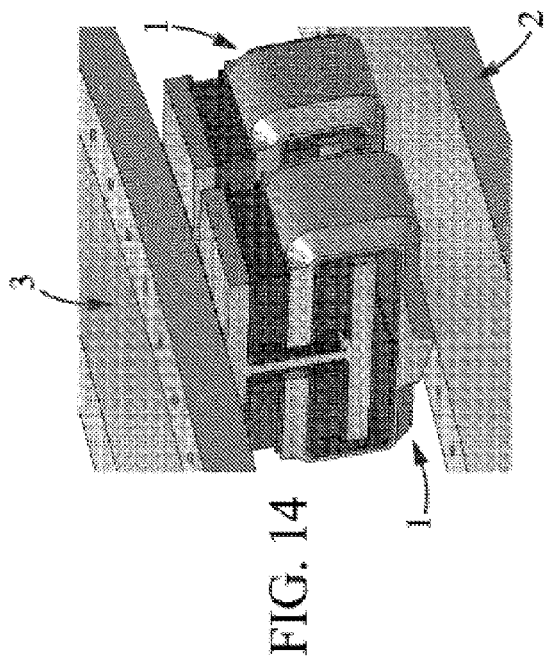
FIG. 14 shows an assembly comprising two circular interface rings between which is mounted a plurality of modules of FIG. 13.

This result is shown in the diagram in FIG. 12, which shows the symmetrical behaviour of the module 1 for the same three materials as those used for the diagram in FIG. 9: regardless of the total stiffness $K_T$ of the module 1, the stiffness changes symmetrically regardless of the direction of movement along the longitudinal axis X.

Thus, the combination of the symmetry of the behaviour of the module 1 and the choice of the dimensions of the elastomer pads makes it possible to reduce the non-linear effects.

Figure 13:
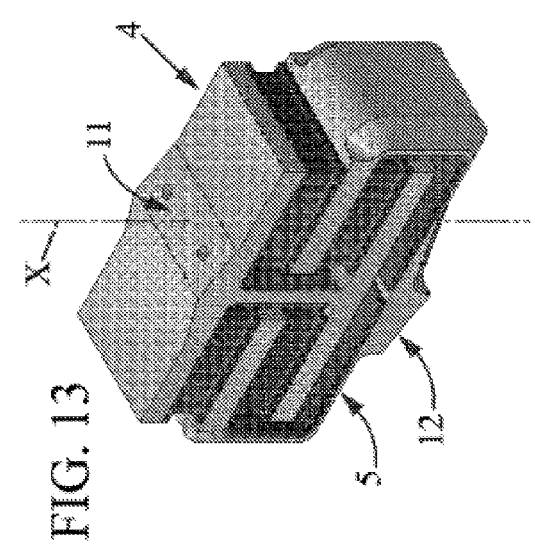
FIG. 13 shows a variant of the pad in FIG. 2.
Figure 15:
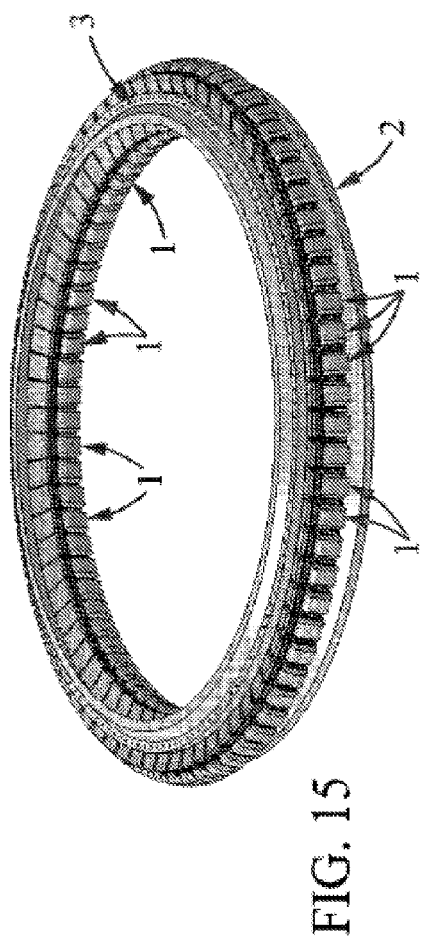
FIG. 15 is a detail view of FIG. 14.

According to a variant, shown in FIG. 13 in particular, the fastening axis, perpendicular to the fastening surfaces 11, 12 of the module 1, are inclined with respect to the longitudinal axis X. However, the axes of the holes 22 all remain parallel to each other in order to minimize the stresses on the fastenings. For example, the fastening axis is inclined at 40° with respect to the longitudinal axis X.

The module thus obtained then has a geometrical plane of symmetry, perpendicular to the radial axis Y, passing through the longitudinal branches 10, 10' of the frame 4.

The above description considers only deflections along the longitudinal axis X.

However, the pads 13, 14 also allow relative movements of the frame 4 and of the support 5 in the directions perpendicular to the longitudinal axis X. The work in shear of the pads 13, 14 is considered to be linear in the applications envisaged. So as to absorb any impact in the radial direction Y of the module 1, the surfaces of the frame 4 oriented toward the support 5 and/or the surfaces of the support oriented toward the frame 4 that are not carrying pads are coated with a layer of elastomer 24. Thus, when one of the fastening parts 4, 5 comes into abutment with the other part 4, 5 under the effect for example of an impact in the radial direction, the impact is absorbed.

Furthermore, the stop 19 of the support 5 can serve as a stop in the case of significant deflection, i.e. in the case of deflection that is so great that it risks damaging the pads. As stated above, the module 1 is dimensioned so that the distance between the first median branch 9 of the support 5 and each of the radial branches 7, 8 of the frame 4 is smaller than the distance between the lower branch 7 of the frame 4 and the stop 19 of the support 5, these being distances when the module is not stressed.

The surface of the stop 19 is then coated with a layer 25 of elastomer, so as to damp the contact between the lower branch 7 of the frame 4 and the stop 19 of the support.

In practice, a plurality of modules 1 are installed between the launcher interface ring 2 and the satellite interface ring 3. The rings 2, 3 have substantially the same diameter. The modules 1 are arranged in such a way that their longitudinal axis X is parallel to the central axis of the rings 2, 3 and their radial axis Y is parallel to the radial axis of the rings 2, 3. The modules are distributed at regular intervals over the entire perimeter of the rings. Thus, it is not necessary to install stops on each module 1 in the third direction, perpendicular to the axes X and Y, since for one module, any movement in this third direction results in a movement in the radial direction for at least one other module 1.

Generally, the isolation module 1 has a symmetry under tension and under compression, i.e. depending on the direction of the force along the longitudinal axis X applied to the module, which is obtained thanks to the arrangement of the pads 13, 13' and 14, 14' in parallel and of the branches 7, 7' and 8, 8' of the frame 4 with respect to the radial branch or branches 9, 9' of the support 5. In fact, deflections of the module 1 are symmetrical, whether the force imposed on the module along the longitudinal axis X is directed in one direction or the other direction, so that the stiffness changes in the same way.

This first arrangement makes it possible to prepare the reduction of the nonlinear behaviour of the elastomer pads 13, 13', 14, 14'.

The pads 13, 13', 14, 14' are then dimensioned according to the relationship (1) in order to reduce the nonlinear behaviour. Thus, the operational range of the module 1 for which the behaviour may be considered linear is increased. Adjustment of the relative stiffness $K_R$ of the assembly formed by the frame 4 and the support 5 makes it possible to reduce the nonlinear behaviour even further.

The pads 13, 13', 14, 14' are still mounted in order to operate per pair, so that when one pad of the pair is compressed, the other pad is stretched. The module 1 has no pad which does not have its symmetrical counterpart.

The module 1 thus formed makes it possible, thanks to the reduction in its nonlinear behaviour, to predict its behaviour with increased precision and allows easy adaptation to launchers and satellites of different designs.

The module 1 can easily be mounted between two interface rings in a known manner, and therefore does not require the development of additional parts.

The embodiments above are intended to be illustrative and not limiting. Additional embodiments may be within the claims. Although the present invention has been described with reference to particular embodiments, workers skilled in the art will recognize that changes may be made in form and detail without departing from the spirit and scope of the invention.

Various modifications to the invention may be apparent to one of skill in the art upon reading this disclosure. For example, persons of ordinary skill in the relevant art will recognize that the various features described for the different embodiments of the invention can be suitably combined, un-combined, and re-combined with other features, alone, or in different combinations, within the spirit of the invention. Likewise, the various features described above should all be regarded as example embodiments, rather than limitations to the scope or spirit of the invention. Therefore, the above is not contemplated to limit the scope of the present invention.

The invention claimed is:

1. An isolation module between a satellite launcher, which is a vibration-generating device, and a satellite structure to be isolated, the isolation module comprising:

at least two fastening parts intended to be fastened respectively on the vibration-generating device and the structure to be isolated, an elastomeric connecting means interposed between the two fastening parts, allowing at least one degree of freedom in translation along a longitudinal axis between the two fastening parts, wherein a first fastening part, comprises a frame that includes;
   two lower branches, one within the continuous extension of the other,
   two upper branches one within the continuous extension of the other; and
   a longitudinal branch extending in the longitudinal plane of symmetry, the frame forming an H,
   the two upper branches and two lower branches of the frame being symmetrical with each other with respect to a plane perpendicular to the longitudinal axis, wherein a second fastening part, comprises a support, the support includes;
   two aligned median branches, one extending toward the other without meeting, the support forming a C, wherein each of the support median branches extend between two branches of the frame, the frame and the support each have a longitudinal plane of symmetry perpendicular to the radial axis, and in which, the elastomeric connecting means comprise at least one pair of identical elastomer pads, in which each pad extends along the longitudinal axis between a first end and a second end, a first pad having the first end supported on a lower branch of the frame and the second end supported on the median branch of the support and the second pad having the first end supported on the upper branch of the frame and the second end supported on the median branch of the support, the two pads of the pair being thus mounted in parallel between the frame and the support and being active along the longitudinal axis in opposite directions, so that when one pad works under tension, the other pad of the pair works under compression, and vice-versa, a stiffness of the module being symmetrical, whether a force applied thereto along the longitudinal axis is oriented in one direction or the opposite direction, and each pad is dimensioned so that a contact surface $S_1$ of one end in contact with a radial branch and a free contact surface $S_2$ satisfy the relationship:

$$\frac{S_1}{S_2} \leq 3.$$

2. The isolation module according to claim 1, in which the assembly formed by the two fastening parts has a relative stiffness comprised between 5% and 30% of the total stiffness of the module.

3. The isolation module according to claim 2, in which the relative stiffness is contributed by a single one of the two fastening parts.

4. The isolation module according to claim 2, in which the relative stiffness is comprised between 20% and 30% of the total stiffness of the module.

5. The isolation module according to claim 1, comprising a plurality of pairs of elastomer pads.

6. The isolation module according to claim 1, in which each fastening part comprises a fastening surface, suitable for placing in contact directly or indirectly with one or other of the vibration-generating device and the structure to be isolated, the fastening surface of the frame being parallel to the fastening surface of the support.

7. The isolation module according to claim 6, in which the fastening surfaces of the two fastening parts are perpendicular to a fastening axis parallel to the longitudinal axis.

8. The isolation module according to claim 6, in which the fastening surfaces of the two fastening parts are perpendicular to a fastening axis that is inclined with respect to the longitudinal axis.

9. The isolation module according to claim 8, in which the angle of inclination of the fastening axis with respect to the longitudinal axis is 40°.

10. The isolation module according to claim 9, in which the fastening location of the frame respectively on one or other of the vibration-generating device and the structure to be isolated and the fastening location of the support respectively on one or other of the structure to be isolated and the vibration-generating device are aligned along the longitudinal axis.

11. The isolation module according to claim 10, in which the frame comprises two lower branches one within the continuous extension of the other and two upper branches one within the continuous extension of the other, extending on either side of two longitudinal branches, the two lower branches having an opening, and in which the support is in the shape of a T, and comprises two median branches extending on either side of a central longitudinal branch passing through the opening of the frame so that the median branches extend between the branches of the frame.

12. The isolation module according to claim 1, in which the vibration-generating device is a launcher for an artificial satellite and the structure to be isolated is the structure carrying an artificial satellite.

13. The isolation module according to claim 12, in which the satellite launcher comprises a circular launcher interface ring and in which the carrying structure comprises a circular satellite interface ring, a plurality of isolation modules being mounted between the interface rings, the frame of each module being rigidly fastened respectively on one or other of the launcher interface ring or the satellite interface ring and the support of each module being rigidly fastened respectively on one or other of the satellite interface ring or the launcher interface ring, each module being arranged so that its longitudinal axis is parallel to the longitudinal axis of the other modules.

14. An isolation module between a satellite launcher, which is a vibration-generating device, and a satellite structure to be isolated, the isolation module comprising:
   at least two fastening parts intended to be fastened respectively on the vibration-generating device and the structure to be isolated,
   an elastomeric connecting means interposed between the two fastening parts, allowing at least one degree of freedom in translation along a longitudinal axis between the two fastening parts,
   wherein a first fastening part, includes a frame of at least two parallel radial branches comprised of two lower branches and two upper branches, the two lower branches and the two upper branches disposed at a distance from each other along the longitudinal axis,
   wherein a second fastening part is a support which comprises at least one radial branch called a median branch, the median branch extending between the two radial branches of the frame, the two radial branches of the frame being symmetrical with each other with respect to a plane perpendicular to the longitudinal axis, wherein one of the two lower branches of the frame is disposed within the continuous extension of the other and one of the two upper branches is disposed within the continuous extension of the other, extending on either side of two longitudinal branches, the two lower branches having an opening, and in which the support is in the shape of a T, and comprises two median branches extending on either side of a central longitudinal branch passing through the opening of the frame so that the median branches extend between the branches of the frame, wherein each of the fastening part comprises a fastening surface, suitable for placing in contact directly or indirectly with one or other of the vibration-generating device and the structure to be isolated, the fastening surface of the frame being parallel to the fastening surface of the support, the fastening surfaces of the two fastening parts are perpendicular to a fastening axis that is inclined with respect to the longitudinal axis, an angle of inclination of the fastening axis with respect to the longitudinal axis is 40°, said fastening location of the frame respectively on one or other of the vibration-generating device and the structure to be isolated and the fastening location of the support respectively on one or other of the structure to be isolated and the vibration-generating device are aligned along the longitudinal axis the elastomeric connecting means comprises at least one pair of identical elastomer pads, in which each pad extends along the longitudinal axis between a first end and a second end, a first pad having the first end supported on a lower branch of the frame and the second end supported on the median branch of the support and the second pad having the first end supported on the upper branch of the frame and the second end supported on the median branch of the support, the two pads of the pair being thus mounted in parallel between the frame and the support and being active along the longitudinal axis in opposite directions, so that when one pad works under tension, the other pad of the pair works under compression, and vice-versa, a stiffness of the module being symmetrical, whether a force applied thereto along the longitudinal axis is oriented in one direction or the opposite direction, and each pad is dimensioned so that a contact surface $S_1$ of one end in contact with a radial branch and a free contact surface $S_2$ satisfy the relationship:

$$\frac{S_1}{S_2} \leq 3.$$

15. The isolation module according to claim 14, in which the assembly formed by the two parallel fastening parts has a relative stiffness comprised between 5% and 30% of the total stiffness of the module.

16. The isolation module according to claim 15, in which the relative stiffness is contributed by a single one of the two fastening parts.

17. The isolation module according to claim 15, in which the relative stiffness is comprised between 20% and 30% of the total stiffness of the module.

18. The isolation module according to claim 14, comprising a plurality of pairs of elastomer pads.

19. The isolation module according to claim 14, in which the vibration-generating device is a launcher for an artificial satellite and the structure to be isolated is the structure carrying an artificial satellite.

20. The isolation module according to claim 19, in which the satellite launcher comprises a circular launcher interface ring and in which the carrying structure comprises a circular satellite interface ring, a plurality of isolation modules being mounted between the interface rings, the frame of each module being rigidly fastened respectively on one or other of the launcher interface ring or the satellite interface ring and the support of each module being rigidly fastened respectively on one or other of the satellite interface ring or the launcher interface ring, each module being arranged so that its longitudinal axis is parallel to the longitudinal axis of the other modules.

21. An isolation module between a satellite launcher, which is a vibration-generating device, and a satellite structure to be isolated, the isolation module comprising:
    at least two fastening parts intended to be fastened respectively on the vibration-generating device and the structure to be isolated,
    an elastomeric connecting means interposed between the two fastening parts, allowing at least one degree of freedom in translation along a longitudinal axis between the two fastening parts,
    wherein a first fastening part, comprises a frame that includes;
        two lower branches, one within the continuous extension of the other,
        two upper branches one within the continuous extension of the other; and
        a longitudinal branch extending in the longitudinal plane of symmetry, the frame forming an H,
        the two upper branches and two lower branches of the frame being symmetrical with each other with respect to a plane perpendicular to the longitudinal axis,
    wherein a second fastening part, comprises a support, the support includes;
        two aligned median branches, one extending toward the other without meeting, the support forming a C,
    wherein each of the support median branches extend between two branches of the frame,
    the frame and the support each have a longitudinal plane of symmetry perpendicular to the radial axis, and in which,
    the elastomeric connecting means comprises at least one pair of identical elastomer pads, in which each pad extends along the longitudinal axis between a first end and a second end, a first pad having the first end supported on a lower branch of the frame and the second end supported on the median branch of the support and the second pad having the first end supported on the upper branch of the frame and the second end supported on the median branch of the support, the two pads of the pair being thus mounted in parallel between the frame and the support and being active along the longitudinal axis in opposite directions, so that when one pad works under tension, the other pad of the pair works under compression, and vice-versa,
a stiffness of the module being symmetrical, whether a force applied thereto along the longitudinal axis is oriented in one direction or the opposite direction.

* * * * *